INVENTORS
DAVID T. AYERS JR.
EDWARD GOVAN HILL
BY John F. Phillips
ATTORNEY

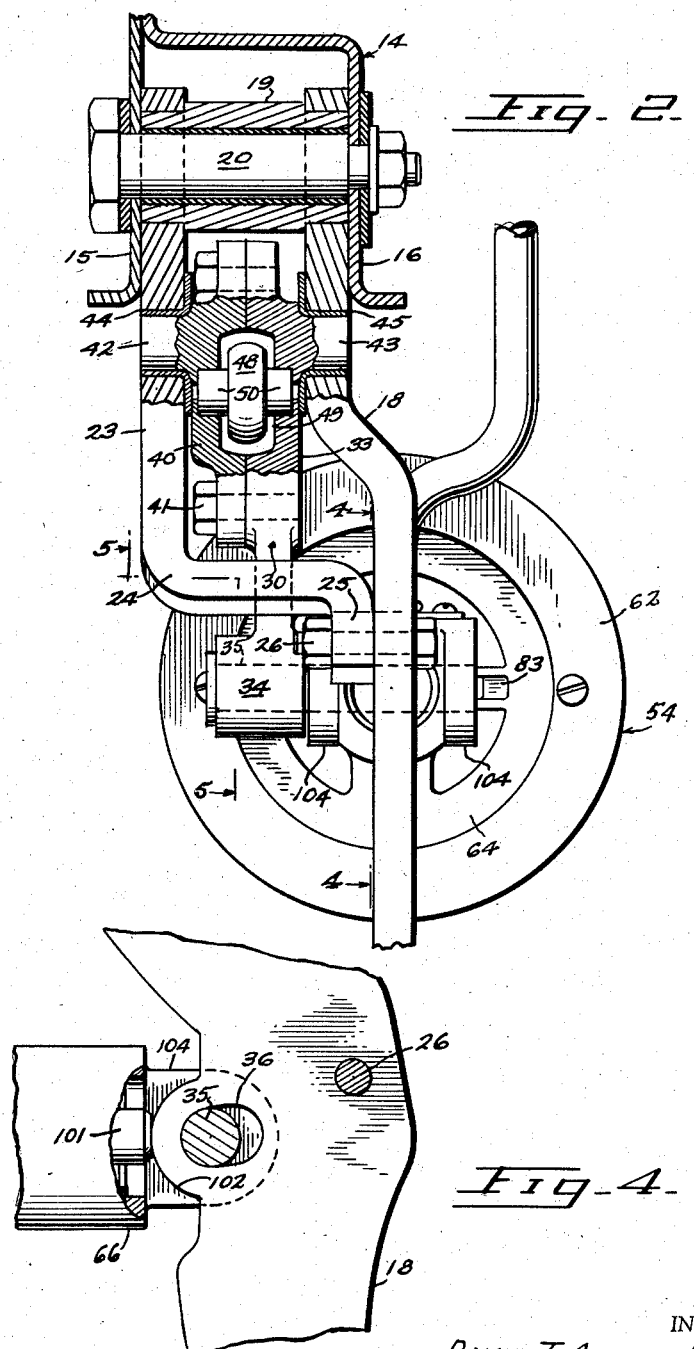

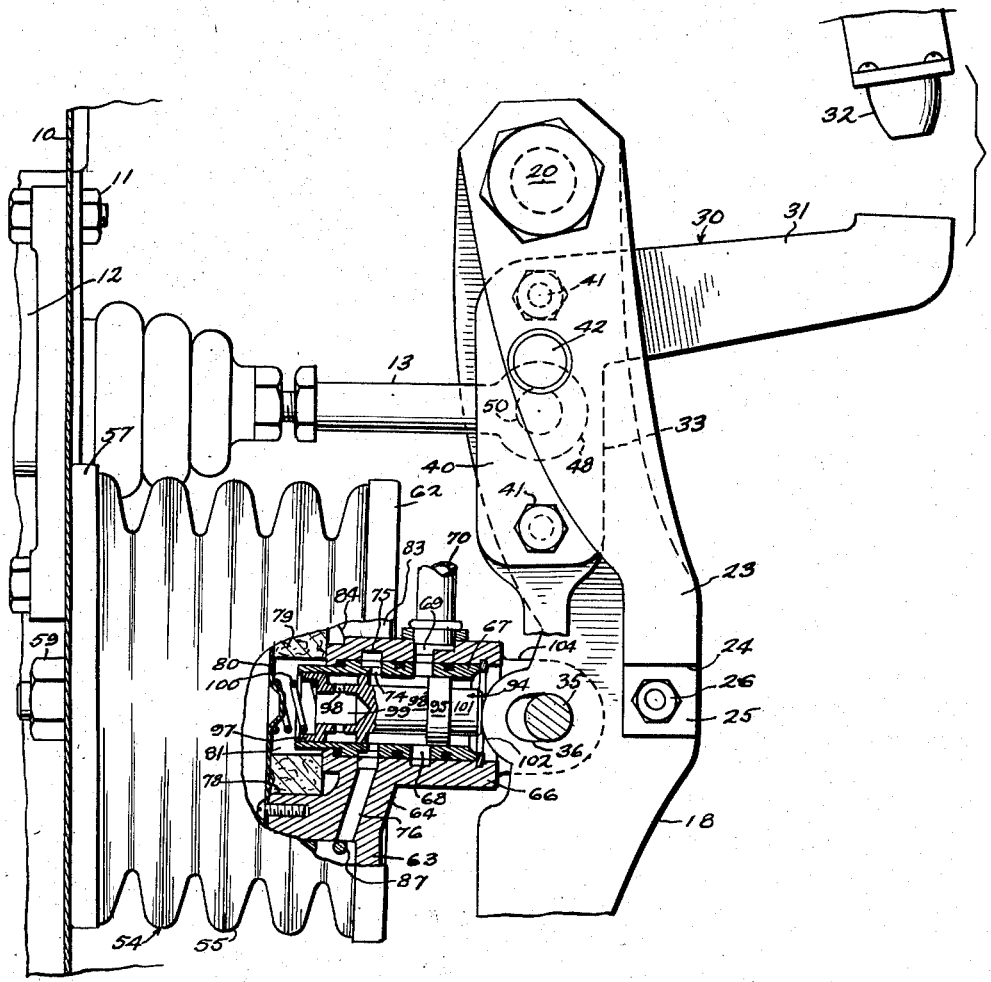
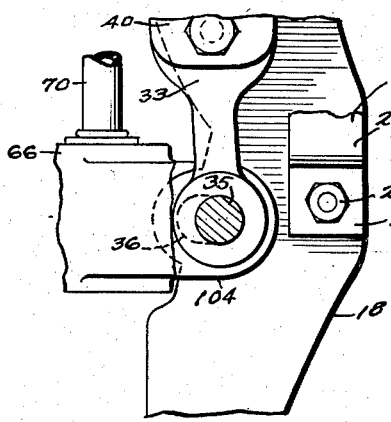

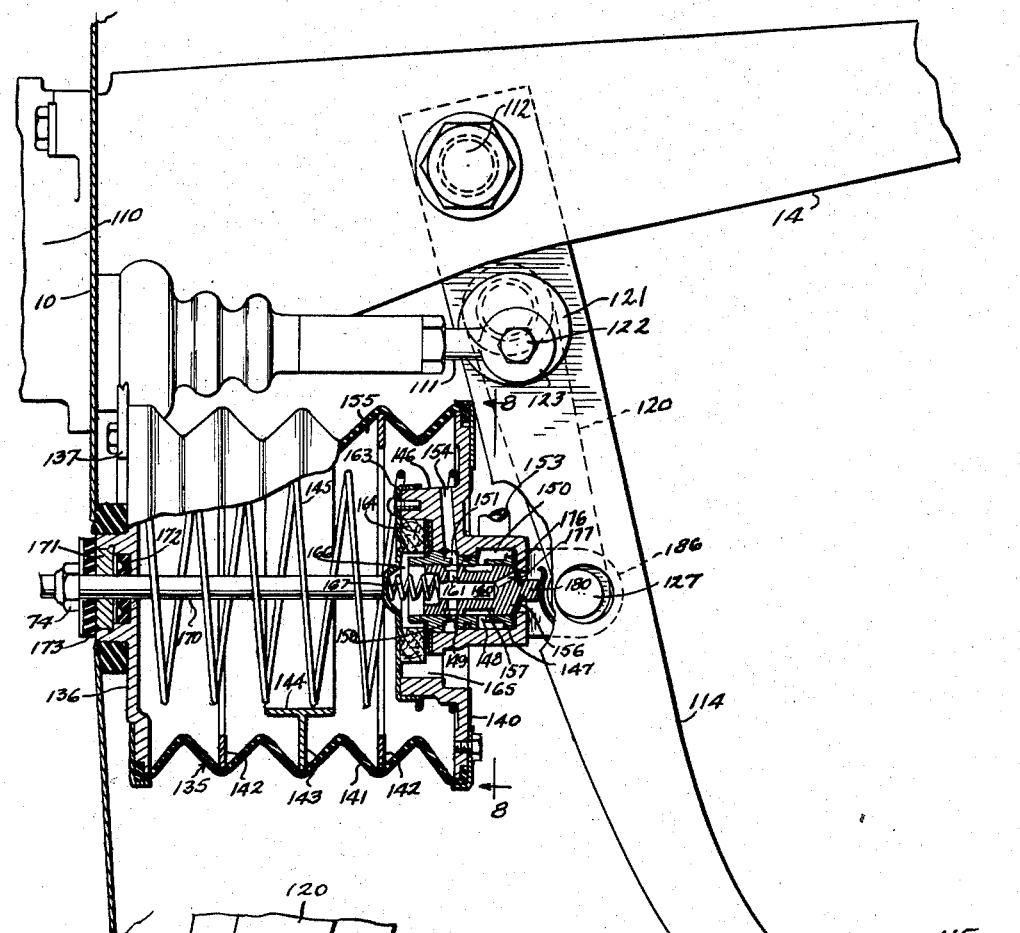

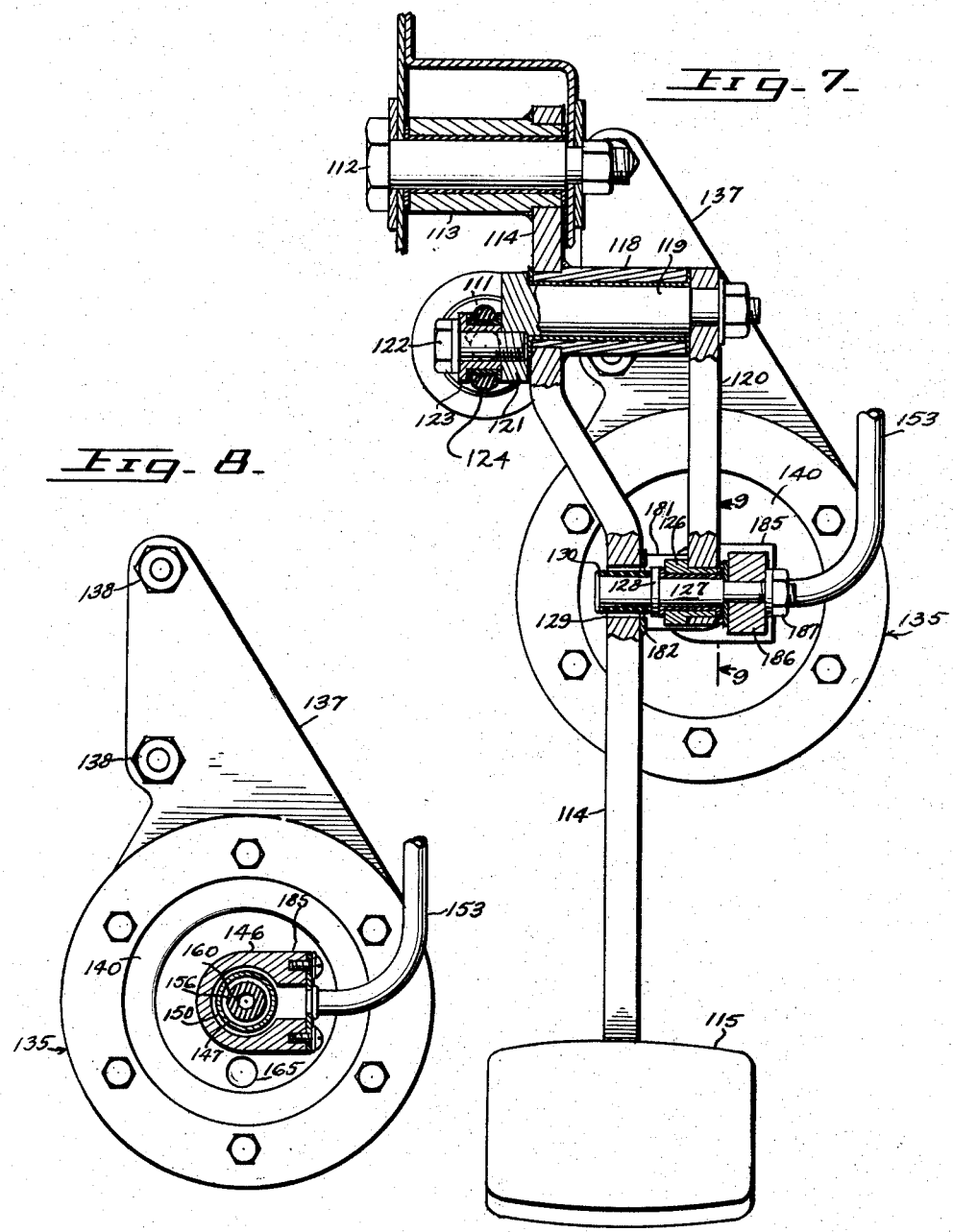

United States Patent Office 2,896,584
Patented July 28, 1959

2,896,584

BOOSTER MOTOR CONTROL MECHANISM

David T. Ayers, Jr., and Edward Govan Hill, Birmingham, Mich., assignors to Kelsey-Hayes Company, a corporation of Delaware Application April 2, 1954, Serial No. 420,488

6 Claims. (Cl. 121—41)

This invention relates to a booster brake mechanism.

Several types of motor vehicles now manufactured are provided with hydraulic brake systems including a master cylinder mounted forwardly of the fire wall of the vehicle and operable, through the medium of an intervening rod, by a depending brake pedal, that is, a pedal pivotally supported at its upper end and provided at its lower or free end with a pedal pad.

An important object of the present invention is to provide a novel type of booster mechanism particularly intended for use in conjunction with brake mechanisms of the type referred to and which is of such construction as to permit it very easily to be adapted as either standard or optional equipment on a motor vehicle of the type referred to, and which readily can be installed as an accessory.

A further object is to provide such a mechanism wherein a pedal lever, comparable to the pedal lever of vehicles of the type referred to, employed for direct pedal actuation of the master cylinder, is provided in conjunction with an auxiliary power transmitting lever connected to a novel type of booster motor, and wherein the pedal lever is mounted to partake of sufficient movement relative to the auxiliary lever for operating the valve mechanism of the booster motor.

A further object is to provide such a device wherein the free movement between the pedal lever and the auxiliary lever is limited, whereby these levers are bodily movable to permit direct pedal pressure to assist the booster motor in applying the brakes after the booster motor has been energized to a maximum extent.

A further object is to provide a booster brake mechanism of the type referred to, wherein the operating rod for the master cylinder plunger is conventionally arranged and the booster motor is connected to the lever mechanism separately from the master cylinder operating rod, thus wholly disassociating the booster motor from the master cylinder and eliminating any problem as to leakage of master cylinder fluid into the booster motor.

Other objects and advantages of the invention will become apparent during the course of the following description.

In the drawings I have shown two embodiments of the invention. In this showing:

Figure 2 is an end elevation of the mechanism, parts being shown in section;

Figure 3 is a view similar to Figure 1, showing the parts in operative positions;

Figure 4 is a fragmentary sectional view on line 4—4 of Figure 2;

Figure 5 is a detail sectional view on line 5—5 of Figure 2, showing the lever elements and associated parts in the positions they will occupy for the manual assisting of the motor in applying the brakes;

Figure 6 is a view similar to Figure 1, showing a modified form of the invention;

Figure 7 is an end elevation of the same, parts being shown in section;

Figure 8 is a detail sectional view on line 8—8 of Figure 6; and

Figure 9 is a view similar to Figure 4 on line 9—9 of Figure 7.

Figure 1:
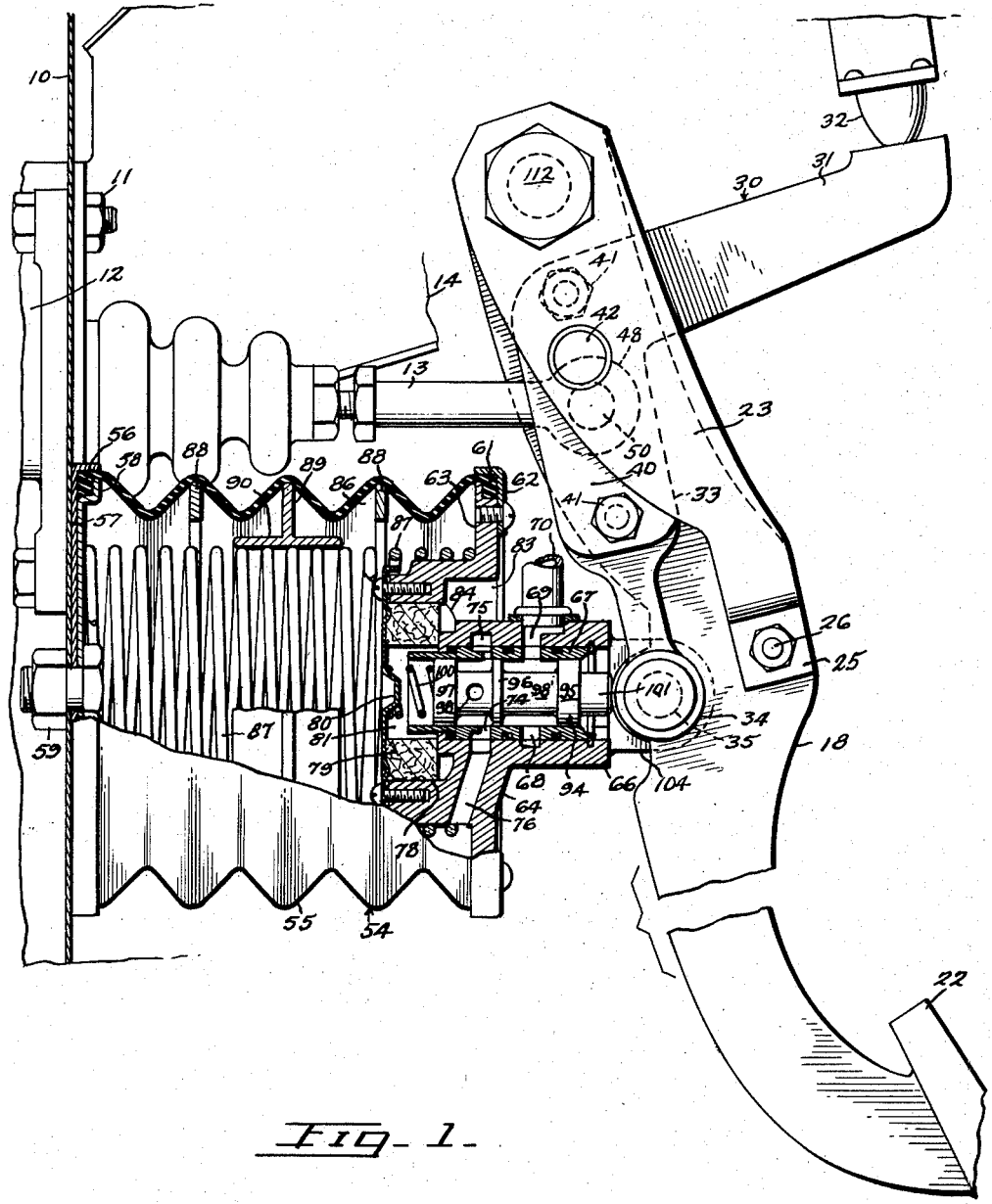
Figure 1 is a side elevation of the mechanism with the parts in off position, parts being broken away and the vehicle fire wall and portions of the motor being shown in section.

Referring to Figures 1 and 3, the numeral 10 designates the fire wall of a motor vehicle to which is bolted, as at 11, a master cylinder 12 in which is mounted the usual piston (not shown) operable by a rod 13 to displace fluid from the master cylinder in the usual manner. The master cylinder and its mounting are now conventional and need not be shown in detail.

Master cylinders of the type referred to are operable by means of depending levers pivotally supported with respect to a rearwardly extending, substantially U-shaped bracket 14 having opposite spaced side walls or arms 15 and 16 (Figure 2). For the conventional pedal lever of such type, there is substituted in the present case a lever 18 carried at its upper end by a sleeve 19 rotatable on a shaft 20 extending through the bracket arms 15 and 16. The pedal lever 18 at its lower end carries a conventional pedal pad 22 (Figure 1). A bracing lever arm 23 also is carried at its upper end by the sleeve 19 and is offset inwardly adjacent its lower end as at 24 and then turned downwardly, as at 25, to lie against the adjacent portion of the lever 18 to which it is bolted, as at 26.

It will be noted that the portions of the lever 18 and arm 23 above the offset 24 are arranged in spaced parallel relation. In the space between these members is arranged a bell crank lever 30 having a rearwardly extending arm 31 engageable with a bumper 32 to limit swinging movement of the bell crank lever to the position shown in Figure 1 when the parts are in the off position. The other arm 33 of the bell crank lever carries at its lower end a bearing 34 in which is arranged a pin 35 movable in a slot 36 (Figure 4) formed in the lever 18. The pin 35 and its operation will be further described below.

The bell crank lever arm 33 is shaped in vertical section as shown in Figure 2 and is provided with a cap member 40 fixed thereto as at 41. This cap and the bell crank lever arm 33 are provided respectively with trunnions 42 and 43 alined with each other and mounted to rock in bearings 44 and 45 carried respectively by the members 23 and 18, as clearly shown in Figure 2.

The operating rod 13 for the master cylinder is provided with a head 48 projecting into a space 49 formed as a pocket within the bell crank lever arm 33 and cap 40. The head 48 carries trunnions 50 rotatably supported by the lever arm 33 and cap 40, also as clearly shown in Figure 2. It will be apparent that bodily movement of the head 48 toward the master cylinder will operate the piston thereof to displace fluid into the brake lines.

At a point spaced below the axis of the master cylinder is arranged a differential fluid pressure operated motor indicated as a whole by the numeral 54. This motor comprises a bellows 55 formed of rubber or any other suitable material and provided at one end with a bead 56 clamped between plates 57 and 58, as shown in Figure 1, and these plates are bolted as at 59 to the fire wall 10. The other end of the bellows 55 is provided with a bead 61 clamped between an annular cap member 62 and a flange 63 formed integral with a valve body 64. The valve body 64, as an integral part thereof, is provided with a cylindrical portion 66 in which is arranged a valve sleeve 67 having ports 68 communicating between the interior of the sleeve and a vacuum port 69 formed in the cylindrical portion 66 and connected to one end of a vacuum line 70. This line leads to the intake manifold of the vehicle engine or any other suitable source of vacuum. The valve sleeve 67 is further provided with ports 74 communicating outwardly thereof with an annular passage 75, and the valve body is provided with a duct 76 communicating between the passage 75 and the interior of the motor 54.

The valve body 64 is provided within the motor with an annular recess 78 in which is arranged an annular air cleaner 79 maintained in position by a solid cap 80. The space 81 within the air cleaner forms an air chamber, as further described below.

The valve body is provided in the outer face thereof with recesses 83 (Figures 1 and 2) open at their outer ends to the atmosphere and communicating at their inner ends with a bowed portion 84 of the recess 78, the recesses 83 accordingly providing openings for the admission of air to the air cleaner 79.

The valve body 64, as will become apparent, has its outer face subject to atmospheric pressure while its inner face is subject to pressures within a motor chamber 86 of the motor, which pressures are controlled by a valve described below. Within the chamber 86 is arranged a return spring 87 engaging the valve body at one end and having its opposite end engaging the plate 58. The bellows 55 is provided with a pair of spaced subtending rings 88, and between these is preferably arranged an additional subtending ring 89 having a radially inner cylindrical flange 90 in which the spring 87 is arranged to assist in positioning the bellows and spring relative to each other.

A valve indicated as a whole by the numeral 94 is slidable in the sleeve 67. This valve is provided with a pair of spaced heads 95 and 96, and the head 96 is spaced from a third head 97. The shank 98' of the valve, which carries the heads referred to, is provided between the heads 96 and 97 with radial ports 98 communicating with an axial recess 99 in the valve 94, which recess communicates with the chamber 81. A small biasing spring 100 is interposed between the valve 94 and cap 80 to urge the valve to its off position shown in Figure 1.

The valve 94 projects to the right of the head 95 as viewed in Figures 1 and 3 to form an operating stem 101. The adjacent edge of the lever 18 is arcuately formed as at 102 to form a contact surface engageable with the end of the stem 101 to move the valve 94 to the left upon operation of the pedal lever 18. The slot 36 is formed in the pedal lever adjacent the arcuately formed operating edge 102 as clearly shown in Figures 3 and 4. The valve body is provided with spaced integral ears 104 (Figures 1, 2 and 3) and the pin 35 passes through these ears and accordingly is movable with the valve body.

In Figures 6–9, inclusive, I have shown a modified type of apparatus in which the operational characteristics are substantially identical with the form described. Referring to Figure 6, the numeral 110 designates a master cylinder having the usual piston (not shown) therein operable by a rod 111. In the modified form of the invention, the conventional bracket 14, described above, carries a pivot pin 112 (Figure 7) surrounded by a sleeve 113 mounted to rock thereon and welded or otherwise connected to the upper end of a pedal lever 114. Such lever, as before, is provided with a conventional pedal pad 115 and the pedal is of the depending type.

Below the pin 112, the pedal lever carries a sleeve 118 preferably welded thereto, and this sleeve rotatably supports a pin or rock shaft 119 to the right-hand end of which, as viewed in Figure 7, is connected a depending lever 120 which functions in the same manner as the arm 33 of the bell crank lever 30 previously described. At one end, the rock shaft 119 is provided with a preferably integral eccentric collar 121 carrying a pivot pin 122 upon which is mounted a bearing sleeve 123 upon which is journalled a head 124 carried by the operating rod 111.

At its lower end, the lever or arm 120 carries a sleeve 126 in which is mounted a pivot pin 127 provided at one end of the sleeve 126 with an integral collar 128. To the left of this collar, the pin 127 projects through an enlarged opening 129, and within such opening the pin 126 is preferably surrounded by a rubber or similar silencing sleeve 130. The opening 129 may be circular, as shown in Figure 6, and serves the same purpose as the slot 36 previously described, as will become apparent.

Referring to Figure 6, the numeral 135 designates a fluid motor having a stationary head or wall 136 carried by a bracket 137 (Figure 8) secured to the fire wall 10 of the motor vehicle by bolts 138. The motor further comprises a movable head or wall 140, and secured at its opposite ends to the two motor heads is a bellows 141 provided therewithin with subtending rings 142 between which is arranged a subtending ring 143. The ring 143 is provided with a cylindrical portion 144 surrounding a compression return spring 145 engaging at its ends against the heads 136 and 140.

The head 140 carries a preferably integral valve housing 146 in which is arranged a sleeve 147 ported as at 148 and 149 for communication respectively with chambers 150 and 151 formed in the valve housing. The chamber 150 (Figure 8) communicates with one end of a hose 153, the other end of which is connected to the intake manifold or other suitable source of vacuum. The chamber 151 communicates through a passage 154 with a motor chamber 155 formed by the motor heads 136 and 140 and the bellows 141.

A valve 156 is slidable in the sleeve 147 and is provided with heads similar to the valve previously described to form annular grooves 157 and 158 normally communicating respectively with the ports 148 and 149. The valve 156 is provided with an axial recess 160 communicating through ports 161 with the groove 158.

A cap 163 is arranged over the inner face of the head 140 and houses therein an air cleaner 164 to which air is fed through one or more openings 165 leading through the head 140 to the atmosphere. A chamber 166 radially inwardly of the air cleaner communicates with the axial valve passage 160. A spring 167 is interposed between the cap 163 and valve 156 to urge the latter to the off position shown in Figure 1.

A rod 170 is welded at one end to the cap 163 and is slidable through a bearing 171 carried by the head 136, the rod inwardly of such bearing being pressure sealed as at 172. Forwardly of the bearing 171, the rod 170 carries a silencing cushion 173 engageable with the bearing 171 and the surrounding portion of the head 136. The member 173 is held in position by a nut 174 threaded on the rod 170.

Within the valve housing is arranged a seal 176 engageable with the rear end of the valve 156, and the latter is provided with a port 177 communicating through the rear end wall of the valve 156 to subject the inner face of the seal 176 to atmospheric pressure at all times.

At its rear end, the valve 156 is provided with a stem 180 engaged by a curved lateral extension 181 (Figure 9) carried by a washer 182 preferably welded to the adjacent face of the pedal lever 114. It will be apparent, therefore, that upon movement of the pedal lever 114 from the normal off position shown in Figure 6, the extension 181 will engage the valve stem 180 and move the valve to the left of its normal off position shown in Figure 6.

At the point of connection of the vacuum pipe 153 to the valve body 146, the rearwardly projecting portion of the latter is laterally enlarged as at 185, and such laterally enlarged portion is provided with a rearwardly extending ear 186. The right-hand end of the pin 127

(Figure 7) projects through the ear 186 and is fixed thereon by a nut 187.

Operation

The operation of the form of the invention shown in Figures 1-5, inclusive, is as follows. The biasing spring 87 moves the valve body 63, forming the pressure head of the motor, to the position shown in Figure 1, and the spring 100 biases the valve 94 to the off position. Under such conditions, the stem 101 engaging the operating edge 102 of the pedal lever holds this lever in its off position. The rod 13 is biased to its limit of movement toward the right in Figure 1 by the springs 87 and 100, the bell crank lever effecting such movement and turning about the axis of the trunnions 42 and 43 to maintain the lever arm 31 against the bumper 32.

When the brakes are to be operated, the pedal pad 22 will be pushed downwardly and forwardly, and due to the slot 36 (Figure 4) the pedal lever 18 is free to move independently of the bell crank lever 30 during motor energizing movement. In the off positions of the parts, the ports 74 communicate with ports 98 and thus with the air chamber 81, and atmospheric pressure will be present in the motor chamber 86. Promptly upon depression of the pedal pad 22, however, the valve 94 will be moved to the left of the position shown in Figure 1. This operation moves the head 96 across the ports 74 to close communication between the motor duct 76 and the atmosphere and to open communication from such duct through ports 74 to the space between the heads 95 and 96 and thus to the vacuum port 69.

Air will now be exhausted from the motor chamber 86, and atmospheric pressure acting against the head or valve body 63 will move such member toward the left. This movement will continue so long as pedal pressure is applied to maintain the valve 94 in a motor energizing position relative to the valve sleeve 67.

As soon as the motor is energized in the manner stated, the ears 104 will impart movement to the pin 35 to move the lower bell crank lever arm 33 toward the left. This operation takes place with the lever 18 swinging in a clockwise direction about its supporting shaft 20, and accordingly the trunnions 42 and 43 will be moved to the left as the lower end 33 of the bell crank lever partakes of the same movement, but at a slower rate, due to the lever lengths involved, as will be apparent.

Brake applying force will be applied to the rod 13 through the trunnions 50, and this force will be applied partly through the trunnions 42 and 43, movable with the pedal lever, and partly by the pin 35, movable by the motor. The amount of force applied manually will be determined by the ratio between the distance between the axes of the trunnions 42 and 43, and 50, and the distance between the axis of the trunnions 50 and the axis of the pin 35. This ratio may be designed as desired in accordance with the direct pedal effort to be applied by the operator.

The operation referred to will continued up to a given hydraulic pressure in the master cylinder, for example from 600-800 lbs., and as motor energization approaches a maximum, the pedal lever 18 will advance in its movement toward the motor and with respect to the pin 35 until this pin is arranged in the rear end of the slot 36, as shown in Figure 3. This point will be reached at the point of power "run-out" of the motor, that is, the point at which the motor is energized to a maximum extent. Such energization is not sufficient for maximum brake application. Beyond such point, the motor applies its force to the pin 35 as before, and pressure of the foot on a pedal pad 22 will be applied from the rear end of the slot 36 directly to the pin 35 to assist the latter in moving the bell crank lever. During the remainder of the brake application, the pedal lever 18 and the bell crank lever obviously will move bodily as a unit until maximum brake application is reached.

Up to the point of approximate power "run-out" the pin 35 will be spaced from the rear end of the slot 36, it being unnecessary for the ports 74 to be fully opened as in Figure 3. Relatively slight cracking of these ports by the valve head 96 is all that is necessary for the relatively rapid energization of the motor.

The operation involved in the returning of the parts to normal off positions will be apparent. Promptly upon the releasing of the pedal lever 18, the spring 100 will move the valve 94 to its normal off position, the lever 18 swinging counterclockwise relative to its supporting shaft 20 until the pin 35 is arranged in the left-hand end of the slot 36 as shown in Figure 4. The motor chamber 86 will now be connected to the atmosphere through ports 74 and 98 and through the air chamber 81, and the biasing spring 87 will move the motor head 63 back to its normal position shown in Figure 1.

In the form of the invention shown in Figures 6-9 inclusive, the parts normally occupy the position shown in Figure 6. When the brake is to be operated, the pedal pad 115 is depressed to swing the pedal lever 114 in a clockwise direction about the axis of the pin 112. The lateral extension 181, movable with the pedal lever, engages the valve stem 180 and moves the valve 156 to the left, disconnecting the ports 161 from the ports 149. Previously, the motor chamber 155 will have been in communication through these ports with the air chamber 166, but movement of the valve referred to now disconnects the motor chamber 155 from the atmosphere. The valve groove 157 is now moved into communication with the ports 151, thus connecting the source of vacuum to the interior of the motor by means of the pipe connection 153, chamber 150, etc. The movable wall 140 now starts to move to the left carrying with it, through ear 186, the pin 127 which is carried by the lower end of the lever arm 120. Thus a force is imparted to the shaft 119 tending to rock it and move the operating rod 111 (Figure 6) to the left. Since movement will be imparted to the shaft 119 to move the latter bodily to the left upon operation of the pedal lever 114, the pedal lever cooperates with the motor in applying force to the rod 111 to move it to the left and displace fluid from the master cylinder into the brake lines.

When the motor approaches a point of power "run-out" as discussed above, the pedal lever 114 will advance toward the left relative to the pin 127, and the right-hand extremity of the opening 129 (Figure 6) will be engaged with the sleeve 130 (Figure 7). Foot-applied pressure to the pedal lever will now assist the motor in applying brake forces to the master cylinder piston and the lever 114 and lever arm 120 will move as a unit, both turning about the axis of the pin 112. Thus the pedal lever forces will assist the motor 135 in effecting maximum brake applications.

When the motor is energized, the wall 140 moves toward the left carrying with it the rod 170 which slides in the bearing 171. The rod 170 limits movement of the movable head 140 to off position and also assists in supporting the weight of the valve housing 146, practically all of the weight of this unit being arranged to the left of the pin 127.

The movement of the parts to off position will be apparent from the foregoing. When pressure on the pedal pad 115 is released, the spring 167 will return the valve 156 to its normal off position connecting the motor chamber 155 to the atmosphere. The return spring 145 will now return the movable motor wall 140 to the normal position shown in Figure 6, and such movement is limited by engagement of the cushion member 173 with the bearing 171.

Whereas movement of the movable motor wall of the form of the invention previously described is limited by engagement of the bell crank lever arm 31 with the bumper 32, the use of a bell crank lever is unnecessary in the modified form of the invention since movement of the lever arm 120 is limited by the means carried by the rod 170, just described.

From the foregoing it will be apparent that either form of the invention provides highly simplified means for converting into a booster brake mechanism the pedal-operated mechanisms of the type employing a depending brake pedal pivotally supported at its upper end. It merely is necessary to substitute the lever mechanism for the pedal lever conventionally employed and to mount the booster motor as shown in Figure 1 or Figure 6. The nature of the device is such that it readily may be installed at the factory as optional equipment, and service stations readily may install the device as an accessory on a customer's car.

In booster constructions wherein the master cylinder is embodied as a unit with the booster motor, some difficulties have been encountered in preventing seepage of hydraulic fluid into the motor chamber, thus resulting in a loss of brake fluid. The present device obviates this difficulty since the motor is a wholly separate unit from the master cylinder and the latter cannot be affected by vacuum created in the motor chamber to actuate the device.

Since the invention has been illustrated in connection with a depending brake pedal, it will be obvious that this is the principal intended use of the mechanism. However, the functioning of the device is not limited to its use with this particular type of pedal lever.

It is to be understood that the forms of the invention shown and described are to be taken as preferred examples of the same and that the invention is defined in the appended claims.

We claim:

1. A power mechanism comprising a power operable rod, a pedal lever pivoted at one end for turning movement on a fixed axis and depending from said fixed axis and provided with a pedal pad at its other end, a second lever pivoted to said first lever for turning movement on a second axis spaced from said first axis, a fluid motor comprising a fixed wall, a movable wall spaced therefrom and a bellows connecting said walls, a valve mechanism for said motor carried by said movable wall and comprising a valve having a normal position connecting said chamber to the atmosphere and movable in one direction from said position to connect said chamber to a source of vacuum, means pivotally connecting said movable wall to said second lever at a point spaced from said second axis, a stem carried by said valve and engageable with said pedal lever whereby movement of the latter from a normal off position moves said valve in said direction, and means for limiting movement of said movable wall to a normal off position, said rod being arranged wholly externally of said motor.

2. A power mechanism comprising a power operable rod, a pedal lever pivoted at one end for turning movement on a fixed axis and depending from said fixed axis and provided with a pedal pad at its other end, a second lever pivoted to said first lever for turning movement on a second axis spaced from said first axis and connected to said rod, a fluid motor comprising a fixed wall, a movable wall spaced therefrom and a bellows connecting said walls, a valve mechanism for said motor carried by said movable wall and comprising a valve having a normal position connecting said chamber to the atmosphere and movable in one direction from said position to connect said chamber to a source of vacuum, means mechanically connecting said movable wall to said second lever at a point spaced from said second axis, a stem carried by said valve and engageable with said pedal lever whereby movement of the latter from a normal off position moves said valve in said direction, and a rod fixed at one end to said movable wall and slidable through said fixed wall in sealed relation thereto, said last-named rod having stop means for limiting movement of said movable wall away from said fixed wall to a normal position and said rod being supported for axial movement to support said movable wall against lateral movement relative to said last-named rod.

3. A mechanism according to claim 2 wherein said means mechanically connecting said movable wall to said second lever comprises a pin fixed with respect to said movable wall and pivoted to said second lever.

4. A mechanism according to claim 2 wherein said means mechanically connecting said movable wall to said second lever comprises a pin fixed with respect to said movable wall and pivoted to said second lever, said pedal lever having an enlarged opening in which said pin is arranged to provide limited movement of said pedal lever from a normal off position independently of said pin to move said valve in said direction whereupon said pedal lever engages said pin to transmit pedal lever forces to said pin.

5. A mechanism according to claim 2 wherein said means for mechanically connecting said movable head to said second lever comprises an ear fixed to said movable head and projecting outwardly therefrom, and a pin connected to said ear and pivotally connected to said second lever.

6. A mechanism according to claim 2 wherein said means for mechanically connecting said movable head to said second lever comprises an ear fixed to said movable head and projecting outwardly therefrom, and a pin connected to said ear and pivotally connected to said second lever, said pedal lever having an enlarged opening surrounding said pin to provide for limited movement of said pedal lever from a normal off position independently of said pin for moving said valve in said direction after which said pedal lever will engage said pin to transmit pedal lever forces thereto.

References Cited in the file of this patent

UNITED STATES PATENTS

| Number | Name | Date |
| --- | --- | --- |
| 1,865,815 | Berry | July 5, 1932 |
| 1,865,817 | Berry | July 5, 1932 |
| 1,869,956 | Dewandre | Aug. 2, 1932 |
| 1,902,356 | Monge | Mar. 21, 1933 |
| 2,023,674 | Fawick | Dec. 10, 1935 |
| 2,107,110 | Eaton et al. | Feb. 1, 1938 |
| 2,197,075 | Fitzgerald | Apr. 16, 194_ |
| 2,207,700 | Porter | July 16, 1_ |
| 2,265,546 | Price | Dec. 9, _ |
| 2,365,960 | Ingres | Dec. 2_ |
| 2,445,862 | Price | July _ |
| 2,770,223 | Ayers | Nov _ |

FOREIGN PATENTS

| Number | Country | |
| --- | --- | --- |
| 403,668 | Great Britain | |